US009367967B2

(12) United States Patent
Biondo et al.

(10) Patent No.: US 9,367,967 B2
(45) Date of Patent: Jun. 14, 2016

(54) SYSTEMS AND METHODS FOR ODOMETER MONITORING

(75) Inventors: William A. Biondo, Beverly Hills, MI (US); George Baker, Troy, MI (US)

(73) Assignees: GM Global Technology Operations LLC, Detroit, MI (US); General Motors LLC, Detroit, MI (US)

( * ) Notice: Subject to any disclaimer, the term of this patent is extended or adjusted under 35 U.S.C. 154(b) by 1935 days.

(21) Appl. No.: 12/569,846

(22) Filed: Sep. 29, 2009

(65) Prior Publication Data

US 2011/0077816 A1 Mar. 31, 2011

(51) Int. Cl.
*G01C 22/00* (2006.01)
*G07C 5/00* (2006.01)
*G07C 5/08* (2006.01)

(52) U.S. Cl.
CPC ................ *G07C 5/008* (2013.01); *G07C 5/085* (2013.01)

(58) Field of Classification Search
USPC ..................... 701/29.1, 30.7, 30.8, 32.3, 32.5
See application file for complete search history.

(56) References Cited

U.S. PATENT DOCUMENTS 5,499,182 A 3/1996 Ousborne
6,011,461 A * 1/2000 Luper ........................... 340/441
6,087,965 A * 7/2000 Murphy ........................ 340/991
6,611,755 B1 8/2003 Coffee et al.
6,629,031 B2 9/2003 Gustavsson et al.
6,768,966 B2 7/2004 Ohle et al.
6,772,090 B2 8/2004 Hutton et al.
6,889,127 B2 5/2005 Gustavsson et al.
6,892,131 B2 5/2005 Coffee et al.
6,972,668 B2 12/2005 Schauble
7,212,107 B2 * 5/2007 Nakazawa et al. ............ 340/466
7,489,993 B2 2/2009 Coffee et al.
7,526,367 B2 * 4/2009 Schofield et al. ................. 701/1
7,610,128 B2 * 10/2009 O'Connor et al. ........... 701/32.5

* cited by examiner

*Primary Examiner* — John Q Nguyen
*Assistant Examiner* — Edward Torchinsky
(74) *Attorney, Agent, or Firm* — Dierker & Kavanaugh, P.C.

(57) ABSTRACT

Systems and methods for odometer monitoring are disclosed herein. One example method includes storing an odometer value and a vehicle position in response to an initial triggering event, and determining a second odometer value and a second vehicle position in response to a subsequent triggering event. The odometer value is compared with the second odometer value to detect any odometer value change from the initial triggering event to the subsequent triggering event. The vehicle position is compared with the second vehicle position to detect any vehicle position change from the initial triggering event to the subsequent triggering event. From the comparisons, it is determined whether odometer tampering has occurred.

15 Claims, 3 Drawing Sheets

SYSTEMS AND METHODS FOR ODOMETER MONITORING

TECHNICAL FIELD

The present disclosure relates generally to systems and methods for odometer monitoring.

BACKGROUND

Automobile odometer tampering is a crime and has detrimental effects at many levels of the economy. Automobile manufacturers and legitimate car dealers lose revenue because of the destructive effect such fraudulent activity has on the accurate estimation of the automobile's value. The inaccurate valuation of the automobile that results from odometer tampering may potentially deleteriously affect all levels of the automobile market, from depreciating the wholesale price of the vehicle to increasing the maintenance fees of the consumer. Furthermore, automobile leasing and rental companies, as well as companies that provide cars for their employees' use may lose money as a result of odometer tampering, at least in part because their efforts, to keep accurate track of vehicle mileage and use and to recoup legitimate charges and expenditures for such use, can be sabotaged.

SUMMARY

Systems and methods for monitoring an odometer are disclosed herein. One example of the method includes storing an odometer value and a vehicle position in response to an initial triggering event, and determining a second odometer value and a second vehicle position in response to a subsequent triggering event. The odometer value is compared with the second odometer value to detect any odometer value change from the initial triggering event to the subsequent triggering event. The vehicle position is compared with the second vehicle position to detect any vehicle position change from the initial triggering event to the subsequent triggering event. From the comparisons, it is determined whether odometer tampering has occurred.

BRIEF DESCRIPTION OF THE DRAWINGS

Features and advantages of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Example(s) of the method and system disclosed herein advantageously enable a vehicle and/or a backend service center (e.g., a call center) and/or another party remote from the vehicle (e.g., a rental car company, a fleet management company, or the like) to monitor an odometer, and to identify whether odometer fraud or failure has occurred (or likely occurred) in the vehicle. The method and system advantageously utilize the on-board telematics unit in the vehicle to collect data pertaining to the odometer reading and vehicle position, and thus the vehicle user need not be contacted until odometer fraud or failure is suspected and data indicative of the same has been analyzed.

It is to be understood that, as used herein, the term "user" includes vehicle owners, operators, and/or passengers. It is to be further understood that the term "user" may be used interchangeably with subscriber/service subscriber.

The terms "connect/connected/connection" and/or the like are broadly defined herein to encompass a variety of divergent connected arrangements and assembly techniques. These arrangements and techniques include, but are not limited to (1) the direct communication between one component and another component with no intervening components therebetween; and (2) the communication of one component and another component with one or more components therebetween, provided that the one component being "connected to" the other component is somehow in operative communication with the other component (notwithstanding the presence of one or more additional components therebetween).

It is to be further understood that "communication" is to be construed to include all forms of communication, including direct and indirect communication. As such, indirect communication may include communication between two components with additional component(s) located therebetween.

Figure 1:
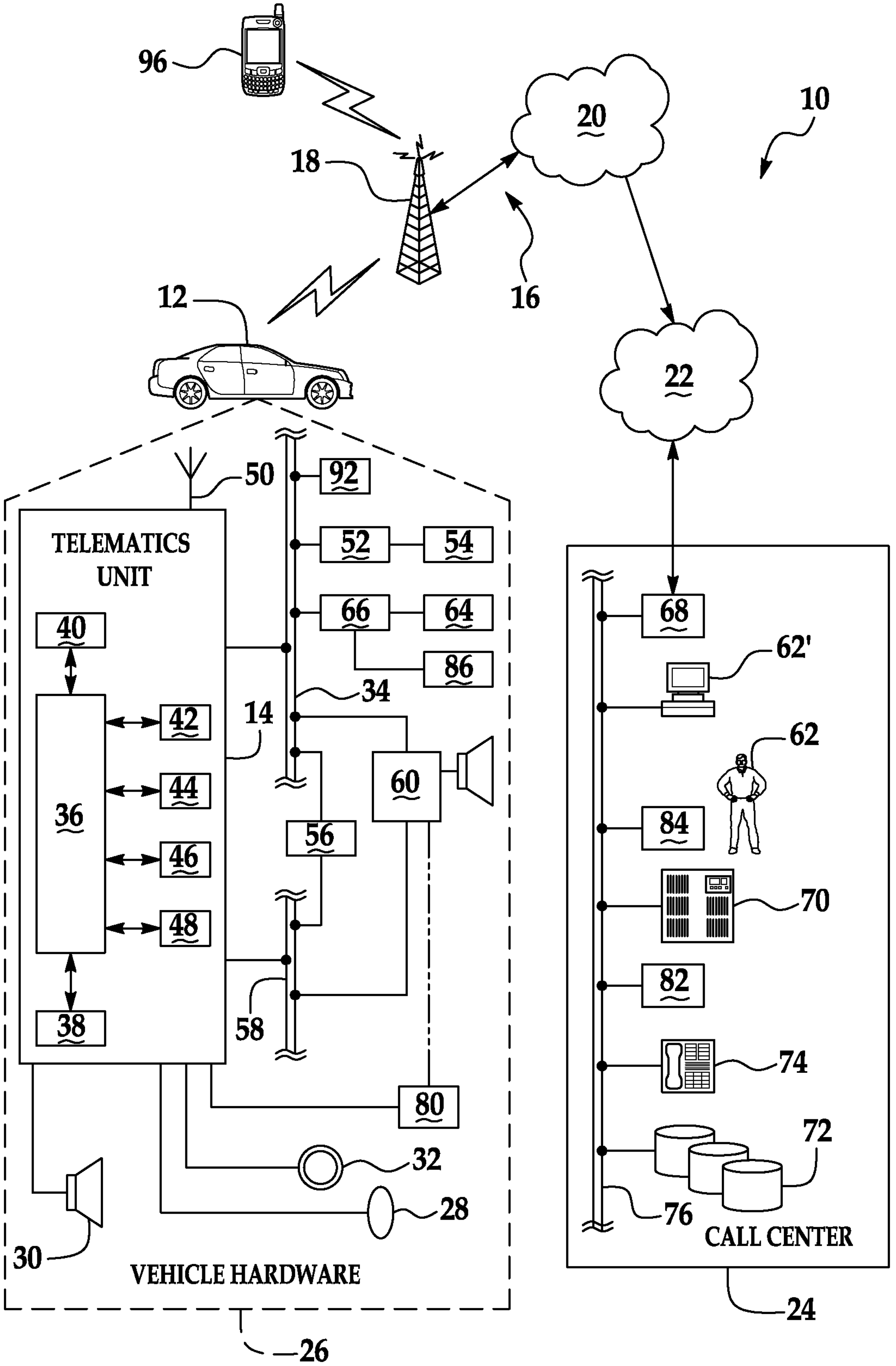
FIG. 1 is a schematic diagram depicting an example of a system for monitoring an odometer.

Referring now to FIG. 1, the system 10 includes a vehicle 12, a telematics unit 14, a wireless carrier/communication system 16 (including, but not limited to, one or more cell towers 18, one or more base stations and/or mobile switching centers (MSCs) 20, and one or more service providers (not shown)), one or more land networks 22, and one or more call centers 24. In an example, the wireless carrier/communication system 16 is a two-way radio frequency communication system. In another example, the wireless carrier/communication system 16 includes one or more devices 96 outside the vehicle 12, which are able to communicate with the vehicle 12 via the telematics unit 14.

The overall architecture, setup and operation, as well as many of the individual components of the system 10 shown in FIG. 1 are generally known in the art. Thus, the following paragraphs provide a brief overview of one example of such a system 10. It is to be understood, however, that additional components and/or other systems not shown here could employ the method(s) disclosed herein.

Vehicle 12 is a mobile vehicle such as a motorcycle, car, truck, recreational vehicle (RV), boat, plane, etc., and is equipped with suitable hardware and software that enables it to communicate (e.g., transmit and/or receive voice and data communications) over the wireless carrier/communication system 16. It is to be understood that the vehicle 12 may also include additional components suitable for use in the telematics unit 14.

Some of the vehicle hardware 26 is shown generally in FIG. 1, including the telematics unit 14 and other components that are operatively connected to the telematics unit 14. Examples of such other hardware 26 components include a microphone 28, a speaker 30, and buttons, knobs, switches, keyboards, and/or controls 32. Generally, these hardware 26 components enable a user to communicate with the telematics unit 14 and any other system 10 components in communication with the telematics unit 14.

Operatively coupled to the telematics unit 14 is a network connection or vehicle bus 34. Examples of suitable network connections include a controller area network (CAN), a media oriented system transfer (MOST), a local interconnection network (LIN), an Ethernet, and other appropriate connections such as those that conform with known ISO, SAE, and IEEE standards and specifications, to name a few. The vehicle bus 34 enables the vehicle 12 to send and receive signals from the telematics unit 14 to various units of equipment and systems both outside the vehicle 12 and within the vehicle 12 to perform various functions, such as unlocking a door, executing personal comfort settings, and/or the like.

The telematics unit 14 is an onboard device that provides a variety of services, both individually and through its communication with the call center 24. The telematics unit 14 generally includes an electronic processing device 36 operatively coupled to one or more types of electronic memory 38, a cellular chipset/component 40, a wireless modem 42, a navigation unit containing a location detection (e.g., global positioning system (GPS)) chipset/component 44, a real-time clock (RTC) 46, a short-range wireless communication network 48 (e.g., a BLUETOOTH® unit), and/or a dual antenna 50. In one example, the wireless modem 42 includes a computer program and/or set of software routines executing within processing device 36.

It is to be understood that the telematics unit 14 may be implemented without one or more of the above listed components, such as, for example, the short-range wireless communication network 48. It is to be further understood that telematics unit 14 may also include additional components and functionality as desired for a particular end use.

The electronic processing device 36 may be a micro controller, a controller, a microprocessor, a host processor, and/or a vehicle communications processor. In another example, electronic processing device 36 may be an application specific integrated circuit (ASIC). Alternatively, electronic processing device 36 may be a processor working in conjunction with a central processing unit (CPU) performing the function of a general-purpose processor.

The location detection chipset/component 44 may include a Global Position System (GPS) receiver, a radio triangulation system, a dead reckoning position system, and/or combinations thereof In particular, a GPS receiver provides accurate time and latitude and longitude coordinates of the vehicle 12 responsive to a GPS broadcast signal received from a GPS satellite constellation (not shown). The position information generated by the location detection chipset/component 44 may be stored in the memory 38 and/or may be transmitted (via the vehicle bus 34 and wireless carrier/communication system 16) to the call center 24 or another party (not shown) for temporary or permanent storage.

The cellular chipset/component 40 may be an analog, digital, dual-mode, dual-band, multi-mode and/or multi-band cellular phone. The cellular chipset-component 40 uses one or more prescribed frequencies in the 800 MHz analog band or in the 800 MHz, 900 MHz, 1900 MHz and higher digital cellular bands. Any suitable protocol may be used, including digital transmission technologies such as TDMA (time division multiple access), CDMA (code division multiple access) and GSM (global system for mobile telecommunications). In some instances, the protocol may be a short-range wireless communication technologies, such as BLUETOOTH®, dedicated short-range communications (DSRC), or Wi-Fi.

Also associated with electronic processing device 36 is the previously mentioned real time clock (RTC) 46, which provides accurate date and time information to the telematics unit 14 hardware and software components that may require and/or request such date and time information. In an example, the RTC 46 may provide date and time information periodically, such as, for example, every ten milliseconds.

The telematics unit 14 provides numerous services, some of which may not be listed herein, and is configured to fulfill one or more user or subscriber requests. Several examples of such services include, but are not limited to: turn-by-turn directions and other navigation-related services provided in conjunction with the GPS based chipset/component 44; airbag deployment notification and other emergency or roadside assistance-related services provided in connection with various crash and or collision sensor interface modules 52 and sensors 54 located throughout the vehicle 12; and infotainment-related services where music, Web pages, movies, television programs, videogames and/or other content is downloaded by an infotainment center 56 operatively connected to the telematics unit 14 via vehicle bus 34 and audio bus 58. In one non-limiting example, downloaded content is stored (e.g., in memory 38) for current or later playback.

Again, the above-listed services are by no means an exhaustive list of all the capabilities of telematics unit 14, but are simply an illustration of some of the services that the telematics unit 14 is capable of offering.

Vehicle communications generally utilize radio transmissions to establish a voice channel with wireless carrier system 16 such that both voice and data transmissions may be sent and received over the voice channel. Vehicle communications are enabled via the cellular chipset/component 40 for voice communications and the wireless modem 42 for data transmission. In order to enable successful data transmission over the voice channel, wireless modem 42 applies some type of encoding or modulation to convert the digital data so that it can communicate through a vocoder or speech codec incorporated in the cellular chipset/component 40. It is to be understood that any suitable encoding or modulation technique that provides an acceptable data rate and bit error may be used with the examples disclosed herein. Generally, dual mode antenna 50 services the location detection chipset/component 44 and the cellular chipset/component 40.

Microphone 28 provides the user with a means for inputting verbal or other auditory commands, and can be equipped with an embedded voice processing unit utilizing human/machine interface (HMI) technology known in the art. Conversely, speaker 30 provides verbal output to the vehicle occupants and can be either a stand-alone speaker specifically dedicated for use with the telematics unit 14 or can be part of a vehicle audio component 60. In either event and as previously mentioned, microphone 28 and speaker 30 enable vehicle hardware 26 and call center 24 to communicate with the vehicle occupants through audible speech. The vehicle hardware 26 also includes one or more buttons, knobs, switches, keyboards, and/or controls 32 for enabling a vehicle occupant to activate or engage one or more of the vehicle hardware components. In one example, one of the buttons 32 may be an electronic pushbutton used to initiate voice communication with the call center 24 (whether it be a live advisor 62 or an automated call response system 62'). In another example, one of the buttons 32 may be used to initiate emergency services.

The audio component 60 is operatively connected to the vehicle bus 34 and the audio bus 58. The audio component 60 receives analog information, rendering it as sound, via the audio bus 58. Digital information is received via the vehicle bus 34. The audio component 60 provides AM and FM radio, satellite radio, CD, DVD, multimedia and other like functionality independent of the infotainment center 56. Audio component 60 may contain a speaker system, or may utilize speaker 30 via arbitration on vehicle bus 34 and/or audio bus 58.

The vehicle crash and/or collision detection sensor interface 52 is/are operatively connected to the vehicle bus 34. The crash sensors 54 provide information to the telematics unit 14 via the crash and/or collision detection sensor interface 52 regarding the severity of a vehicle collision, such as the angle of impact and the amount of force sustained.

Other vehicle sensors 64, connected to various sensor interface modules 66 are operatively connected to the vehicle bus 34. Example vehicle sensors 64 include, but are not limited to, gyroscopes, accelerometers, magnetometers, emission detection and/or control sensors, environmental detection sensors, and/or the like. One or more of the sensors 64 enumerated above may be used to obtain the vehicle data for use by the telematics unit 14 or the call center 24 to determine the operation of the vehicle 12. Non-limiting example sensor interface modules 66 include powertrain control, climate control, body control, and/or the like.

In a non-limiting example, the vehicle hardware 26 includes a display 80, which may be operatively directly connected to or in communication with the telematics unit 14, or may be part of the audio component 60. Non-limiting examples of the display 80 include a VFD (Vacuum Fluorescent Display), an LED (Light Emitting Diode) display, a driver information center display, a radio display, an arbitrary text device, a heads-up display (HUD), an LCD (Liquid Crystal Diode) display, and/or the like.

The vehicle hardware 26 also includes an odometer 92 operatively connected to the telematics unit 14. The odometer 92 is a device used for indicating the distance (e.g., in miles, kilometers, etc.) traveled by the vehicle 14. It is to be understood that the odometer 92 is an electronic device that is capable of transmitting the recorded mileage of the vehicle 14 to the telematics unit 14, which can either store the mileage in the memory 38, or can transmit the mileage to the call center 24 for storage in the user's profile in a database 72 or to another party for storage. Generally, the odometer values are present as messages on the vehicle bus 34, and the telematics unit 14 can access such messages.

Wireless carrier/communication system 16 may be a cellular telephone system or any other suitable wireless system that transmits signals between the vehicle hardware 26 and land network 22. According to an example, wireless carrier/communication system 16 includes one or more cell towers 18, base stations and/or mobile switching centers (MSCs) 20, as well as any other networking components required to connect the wireless system 16 with land network 22. It is to be understood that various cell tower/base station/MSC arrangements are possible and could be used with wireless system 16. For example, a base station 20 and a cell tower 18 may be co-located at the same site or they could be remotely located, and a single base station 20 may be coupled to various cell towers 18 or various base stations 20 could be coupled with a single MSC 20. A speech codec or vocoder may also be incorporated in one or more of the base stations 20, but depending on the particular architecture of the wireless network 16, it could be incorporated within a Mobile Switching Center 20 or some other network components as well.

Land network 22 may be a conventional land-based telecommunications network that is connected to one or more landline telephones and connects wireless carrier/communication network 16 to call center 24. For example, land network 22 may include a public switched telephone network (PSTN) and/or an Internet protocol (IP) network. It is to be understood that one or more segments of the land network 22 may be implemented in the form of a standard wired network, a fiber of other optical network, a cable network, other wireless networks such as wireless local networks (WLANs) or networks providing broadband wireless access (BWA), or any combination thereof.

Call center 24 is designed to provide the vehicle hardware 26 with a number of different system back-end functions. The call center 24 is further configured to receive an image corresponding to a user request and to fulfill the user request upon identifying the request. According to the example shown here, the call center 24 generally includes one or more switches 68, servers 70, databases 72, live and/or automated advisors 62, 62', a processor 84, as well as a variety of other telecommunication and computer equipment 74 that is known to those skilled in the art. These various call center components are coupled to one another via a network connection or bus 76, such as one similar to the vehicle bus 34 previously described in connection with the vehicle hardware 26.

The processor 84, which is often used in conjunction with the computer equipment 74, is generally equipped with suitable software and/or programs configured to accomplish a variety of call center 24 functions.

The live advisor 62 may be physically present at the call center 24 or may be located remote from the call center 24 while communicating therethrough.

Switch 68, which may be a private branch exchange (PBX) switch, routes incoming signals so that voice transmissions are usually sent to either the live advisor 62 or the automated response system 62', and data transmissions are passed on to a modem or other piece of equipment (not shown) for demodulation and further signal processing. The modem preferably includes an encoder, as previously explained, and can be connected to various devices such as the server 70 and database 72. For example, database 72 may be designed to store subscriber profile records, subscriber behavioral patterns, or any other pertinent subscriber information. Although the illustrated example has been described as it would be used in conjunction with a manned call center 24, it is to be appreciated that the call center 24 may be any central or remote facility, manned or unmanned, mobile or fixed, to or from which it is desirable to exchange voice and data communications.

A cellular service provider generally owns and/or operates the wireless carrier/communication system 16. It is to be understood that, although the cellular service provider (not shown) may be located at the call center 24, the call center 24 is a separate and distinct entity from the cellular service provider. In an example, the cellular service provider is located remote from the call center 24. A cellular service provider provides the user with telephone and/or Internet services, while the call center 24 is a telematics service provider. The cellular service provider is generally a wireless carrier (such as, for example, Verizon Wireless®, AT&T®, Sprint®, etc.). It is to be understood that the cellular service provider may interact with the call center 24 to provide various service(s) to the user.

The device 96 is in selective communication with the telematics unit 14 and/or the call center 24. The device 96 may be any mobile or non-mobile device capable of initiating or receiving communications via the wireless network 16. Non-limiting examples of such devices 96 include cellular, landline or Internet-based telephones, laptop or desktop computers having Internet capabilities, personal digital assistants (PDA), or other electronic devices. Such devices 96 are operated via the previously mentioned other party who may be interested in monitoring the vehicle 12 use in order to detect odometer fraud or failure.

Figure 2:
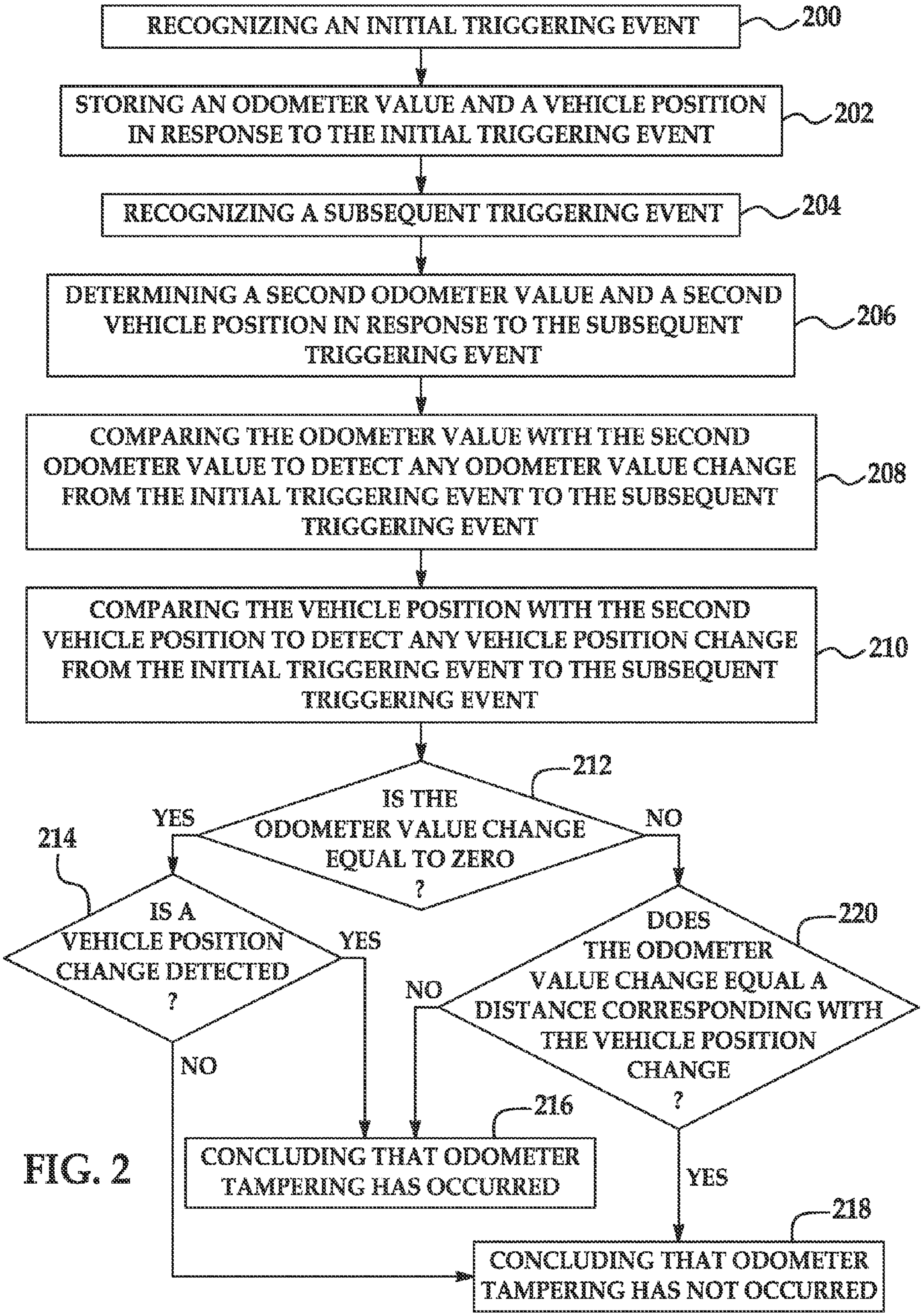
FIG. 2 is a flow diagram depicting an example of a method for monitoring an odometer.

Referring now to FIG. 2, one example of the method is depicted. It is to be understood that this method is not limited with regard to the component(s) of the system 10 by which the method is performed. In one non-limiting example, the method and/or individual steps of the method is/are performed via the telematics unit 14. In another non-limiting example, the method and/or individual steps of the method is/are performed via the call center 24 utilizing the telematics unit 14 to obtain odometer and position information. The description of these two possible components that can be used to perform the method and/or individual steps of the method is in no way a limitation or exclusion of alternative performances of the method with yet other components of the vehicle 12 or the system 10 which are not specifically described herein.

As shown at reference numerals 200 and 202 in FIG. 2, the method begins with the step of recognizing an initial triggering event, and in response to this event, storing a then-current odometer value and the vehicle's then-current position. The triggering event is generally recognized by the telematics unit 14, which in turn retrieves information from the vehicle bus 34. The odometer 92 transmits the then-current odometer value and the location detection chipset/component 44 transmits the then-current position information to the vehicle bus 34 in increments (e.g., every 1/64 of a kilometer). The vehicle bus 34 is an electronic conduit for such messages, and the telematics unit 14 may retrieve such messages from the bus 34 in response to the trigger.

Non-limiting examples of the initial triggering event include the turning off of the vehicle 12 ignition (i.e., an ignition off cycle), a timer recording event, or a message received event.

The ignition off initial triggering event is simply the detection that the vehicle ignition has been turned off It is to be understood that after the ignition is powered off, the telematics unit 14 and vehicle bus 34 remain powered on for a predetermined time. When the ignition off is the trigger, the still active telematics unit 13 will retrieve the desired odometer and position information off of the still active vehicle bus 34.

The timer recording initial triggering event is initiated by an in-vehicle timer (which may be associated with the clock 46) that is set to periodically trigger the recordation of the mileage and vehicle position. As a non-limiting example, the in-vehicle timer may be set to instruct the vehicle bus 34 to retrieve information every 10 seconds. The initial triggering event would be the recordation at the first second, and as described further hereinbelow, the subsequent triggering event would be the recordation at the tenth second.

The message received event is yet another example of the initial triggering event. The message received event involves the telematics unit 14 receiving a message from the device 96 located outside the vehicle 12. Such a device 96 may be operated by the advisor 62, 62' at the call center 24, a fleet manager, or another third party who wishes to initiate the recordation of the then-current mileage by the odometer 92 and the then-current position of the vehicle 12. In one example, a single message may be sent to the telematics unit 14 requesting that two mileages and positions be recorded, the first upon receipt of the message and the second at some predetermined time after receipt of the message. This type of message would constitute both the initial triggering event and the subsequent triggering event (discussed hereinbelow). In another example, a single message may be sent from the device 96 to the telematics unit 14 to initiate recordation of the then-current information. Such messages may be short message service (SMS) messages. The use of the device 96 to trigger recordation events may be desirable, for example, when a fleet manager or other employer suspects an employee of odometer fraud.

When the initial triggering event is detected and the odometer and position information is received in response thereto, such information is date and time stamped (by the clock 46) and saved in a desirable location. In one example, the information is saved in the telematics unit memory 38. In another example, the telematics unit 14 is programmed to automatically transmit such data to the call center 24 for storage in the vehicle user's profile. In still another example, the telematics unit 14 may be instructed to transmit such data to another party (e.g., the party associated with the device 96) for storage in an off-board site.

After some period of time (ranging from seconds to hours, to days, to weeks) has occurred following the initial triggering event and recordation of information in response thereto, a subsequent triggering event is recognized by the vehicle bus 34, as shown at reference numeral 204. In response to the subsequent triggering event, the vehicle bus 34 again requests information from the odometer 92 about the then-current odometer value and information from the location detection chipset/component 44 about the then-current position as shown at reference numeral 206. It is to be understood that the information retrieved in response to the subsequent trigger will have a time stamp that is later than the time stamp of the information retrieved in response to the initial trigger.

Non-limiting examples of the subsequent triggering event include the turning on of the vehicle 12 ignition (i.e., an ignition on cycle), a timer recording event, or a message received event. The ignition on subsequent triggering event is simply the detection that the vehicle ignition has been turned on. The timer recording subsequent triggering event is initiated by the in-vehicle timer that is set to periodically trigger the recordation of the mileage and vehicle position. Referring back to the example provided for the initial triggering event, the in-vehicle timer may be set to instruct the vehicle bus 34 to retrieve information every 10 seconds. The subsequent triggering event would be the recordation at every tenth second in the interval period.

The message received event is yet another example of the subsequent triggering event. The message received event involves the telematics unit 14 receiving a message from the device 96 located outside the vehicle 12. In the example in which a single message is sent to the telematics unit 14 requesting that two mileages and positions be recorded, the portion of the message indicating second recordation (at some predetermined time after receipt of the message) would be the subsequent triggering event. In another example, a single message may be sent from the device 96 to the telematics unit 14 to initiate recordation of the then-current information. This single message is generally received after a previous message had been sent as the initial triggering event.

As described herein, the subsequent triggering event usually correlates closely with the initial triggering event. Thus, the ignition off cycle initial triggering event is followed by an ignition on cycle subsequent triggering event, the timer recording initial triggering event is followed by a subsequent timer recording event, and the sent message initial triggering event is followed by a subsequent sent message event. These non-limiting examples are not intended to exclude other types of possible correlating triggering events not specifically described herein.

The data retrieved in response to the subsequent trigger may be stored in a similar manner to that previously described for the data retrieved in response to the initial trigger.

The next two steps (see reference numerals 208 and 210) in the method shown in FIG. 2 respectively involve comparing the odometer and position data after the second odometer value and second vehicle position have been retrieved. These steps can be performed simultaneously or subsequently in no preferred order. The comparisons are made in order to determine i) if a change in the odometer value has occurred from the initial triggering event to the subsequent triggering event, and ii) if a change in the vehicle position has occurred from the initial triggering event to the subsequent triggering event. In one example, the telematics unit 14 installed in the vehicle 12 performs the comparing steps, and in another example, the comparing steps are performed by the call center 24. It is to be understood that the component 14 or 24 of the system 10 performing the comparing is configured with a software routine (including one or more algorithms) capable of making such a comparison. In some instances, both the telematics unit 14 and the call center 24 are capable of making the comparison.

The comparison between the initial and subsequent odometer values enables telematics unit 14 or the call center 24 to determine whether the odometer value change is equal to zero, as shown at reference numeral 212. When a determination is made that the odometer value change is equal to zero, the telematics unit 14 or call center 24 then determines whether a vehicle position change has been detected (e.g., by comparing the initial and subsequent position readings), as shown at reference numeral 214.

When the vehicle position has not changed and the odometer value change equals zero, the telematics unit 14 or call center 24 determines that odometer tampering has not occurred (see reference numeral 218), and, in some instances, no further action is taken (except repeating the steps to determine if tampering occurs at another time). If another party is monitoring the vehicle 12 performance (e.g., a fleet manager or rental car company that requests or triggers the data recordation), when it is concluded that no tampering has occurred it may be desirable to transmit such information to the other party. Though it may not be necessary or even desirable in every case, the other party can be contacted to report the fact that no tampering has been identified. In a non-limiting example, this reporting may be accomplished via text messaging or e-mail, or the information can be posted on a website.

In a non-limiting alternative example, when the vehicle position has changed from the initial triggering event to the subsequent triggering event and the odometer value change still equals zero, there is an implication that the odometer 92 has been or was disconnected during the trip. As such, the telematics unit 14 or call center 24 (whichever entity is performing the method) determines that odometer tampering has occurred (see reference numeral 216). In such instances, the telematics unit 14 or call center 24 may be configured to send a message to an appropriate party within or outside the system 10 to notify such party of the tampering.

It is to be understood that prior to notifying the other party, the telematics unit 14 and/or the call center 24 may store such data in the memory 38 or the database 72, respectively. The telematics unit 14 may be configured to enter the data in a maintenance, usage or performance log, such as a log utilized by fleet companies. This information may be transmitted to the call center 24 for storage and/or to the other party via a data transmission. The call center 24 may be configured to enter the data into the associated user's profile (stored in database 72), either automatically or via a human advisor 62. The data is then extracted from the database 72 and the information can be sent to the appropriate party via a data transmission.

Furthermore, if the results of the monitoring are questionable, the system 10 may determine whether the odometer 92 is faulty. When it is so desired, the call center 24 can direct the telematics unit 14 to, or the telematics unit 14 can on its own, scan for diagnostic trouble code (DTC) regarding the condition of the odometer 92. If a DTC is found, the telematics unit 14 or call center 24 can notify the other party of both the monitoring results and the DTC.

In another non-limiting example, it is also possible to provide an incentive to the user of the vehicle 12 to refrain from odometer tampering, but also to cooperate with and benefit from the odometer monitoring system 10. As a non-limiting example, an opt-in program could be used in which vehicle 12 odometer readings are verified and certified in a user's maintenance record. This certification, along with maintenance records (e.g., such as periodic oil changes) may enhance the resale value of the vehicle 12, which in turn, motivates the user to participate in the opt-in program.

Referring back to FIG. 2, when a determination is made that the odometer value change does not equal zero, such determination is indicative of the fact that the vehicle 12 has been moved. It is to be understood that the odometer value change is equal to the difference between the subsequent odometer reading and the initial odometer reading. When odometer tampering has not occurred, this difference (i.e., the odometer value change) should equal (or be within a predetermined threshold of) a distance corresponding with a vehicle position change, as shown at reference numeral 220. Using the initial and subsequent vehicle positions, the telematics unit 14 or the call center 24 can determine a probable distance that the vehicle 12 has traveled, and this distance is compared with the odometer value change.

Figure 3:
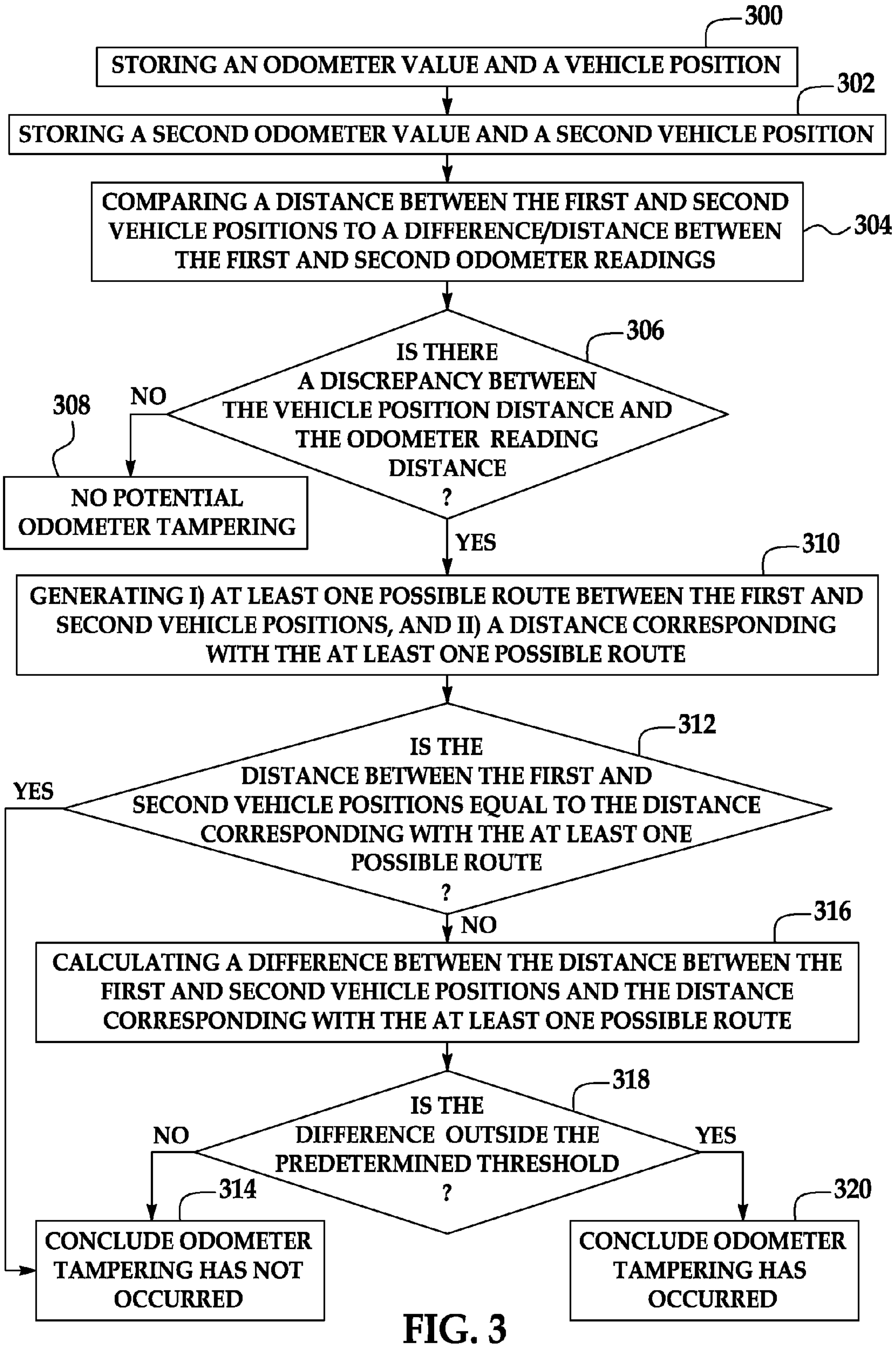
FIG. 3 is a flow diagram depicting an example of another method for monitoring an odometer.

The distance may be calculated using great circle navigation algorithms or by accessing a digital map database by which a plurality of routes between the starting and ending positions can be determined (the latter method is described further in reference to FIG. 3). The great-circle distance formula is:

$$\text{Distance}=\arccos((\sin(\text{lat1})*\sin(\text{lat2}))+(\cos(\text{lat1})*\cos(\text{lat2})*\cos(\text{lon1}-\text{lon2}))),$$

where lat1 and lat2 are the starting and end point latitude values and lon1 and lon2 are the starting and endpoint longitude values. Generally, when this method is used, the mileage driven or the odometer difference incurred is not less than the great circle distance between two points.

When the values are equal, it can be concluded that tampering has not occurred (see reference numeral 218), and when the values are not equal (or not within some predetermined threshold), it can be concluded that odometer tampering has occurred (see reference numeral 216). In either instance, desired parties may be notified as described herein.

In a non-limiting example, the process of comparing the distance with the odometer value change can be an automated process. In another non-limiting example, it is possible for human advisors 62 to perform any of the calculations that might be used in the comparing step. When the process is performed by an automated process, the processor 36 can receive the data from the odometer 92 via the vehicle bus 34, or the call center 24 can receive such data from the telematics unit 14 and may be configured to run such calculations. As discussed herein, regardless of where the comparison takes place, the position data is received from the location chipset 44.

While not shown in FIG. 2, it is to be understood that the comparison between the initial and subsequent positions may be made prior to detecting any odometer change value. In such instances, similar comparisons will be made to those previously described to determine if fraud has or has likely occurred. For example, if the position is the same, but the odometer value has changed (e.g., has less miles than the previous reading), then it is concluded that odometer tampering has occurred. Still further, odometer tampering may be implied by examining RPM data, shifting activity, braking, or the like, and such data is available on the vehicle bus 34.

One non-limiting example of the method shown in FIG. 2 is now provided. In this example, the vehicle 12 is initially parked and stored for a period of time, e.g., at an airport parking lot. As such, the vehicle 12 would not, under most circumstances, be expected to accumulate mileage during this time period. The initial triggering event may be the ignition off cycle at the time that the vehicle 12 is parked. When a subsequent ignition on cycle or event is recognized, the vehicle position and odometer value at the time of this cycle/event are recorded and compared to the data recorded at the previous triggering event.

As a general rule, when the initial and subsequent odometer readings are the same (i.e., the change equals zero) and the position has not changed between the initial and subsequent readings, one can determine that odometer fraud has not taken place.

However, in this example, when tampering has taken place, there may be intervening on and off events that have taken place. For example, if a user turns the ignition on, disconnects the odometer 92, drives around, and then parks the vehicle 12 back in the same spot, the odometer change value will be zero and the position change will appear to be zero even though the vehicle 12 has been through at least one set of intervening on/off events and moved. Since multiple on/off events have occurred (and recorded and cached on the vehicle bus 34), the zero odometer change value signals the telematics unit 14 or call center 24 to retrieve data regarding RPMs, shifting activity, and braking, all of which are available information on the vehicle bus 34. This additional data can be analyzed to determine if the vehicle 12 was driven during the intervening on/off period. As such, the recognition of multiple on/off events and no odometer value change is a sub-trigger to evaluate for fraud.

As previously discussed, there are also situations where odometer tampering and fraud can be detected when the vehicle 12 has not been moved, but an odometer change occurs.

Another non-limiting example of the method shown in FIG. 2 is now provided. In this example, the vehicle 12 is in use. The internal clock 46 of the telematics unit 14 is set to trigger a recording event every minute. After the first minute of travel, the telematics unit 14 retrieves the then-current odometer value and vehicle position, and after the second minute of travel, the telematics unit 14 retrieves the then-current odometer value and vehicle position. Such data recordation continues at the designated intervals until the vehicle 12 is turned off In this non-limiting example, when it is desirable to review for odometer fraud, the call center 24 retrieves the two most recent sets of odometer readings and position readings. The call center 24 compares the change in the odometer value with the change in position to determine if odometer fraud has likely occurred.

Still another non-limiting example of the method shown in FIG. 2 is now provided. In this example, the vehicle 12 is a part of a fleet team, and the driver has the vehicle 12 on the weekend (i.e., during non-work time). The fleet manager is concerned that the driver is misusing the vehicle 12 during off hours. As such, the fleet manager sends a message (via device 96 in selective operative communication with the telematics unit 14) to trigger both the initial data recording event and the subsequent data recording event. The message instructs the telematics unit 14 to record then-current odometer and position information upon receipt of the message and then upon recognition of the vehicle off event. The message also instructs the telematics unit 14 to compare the recorded data and to transmit the results of the comparison to the device 96. After recording the two sets of data, the telematics unit 14 calculates any numerical difference between the odometer values and calculates any distance between the position readings. The telematics unit 14 compares the change in the odometer value with the change in position to determine if odometer fraud has likely occurred. Such information is then transmitted, in the form of a message, back to the device 96.

Referring now to FIG. 3, another example of the method is depicted. As with the example of the method described in FIG. 2, this further example is not limited with regard to the device(s) by which the method is performed. In one non-limiting example, all of the individual steps of the method can be performed via a telematics unit 14. In another non-limiting example, the data collection is accomplished via the on-board location detection chipset/component 44 and odometer 92, and the remaining steps are performed via the call center 24.

As shown in FIG. 3 at reference numeral 300, the method begins with the step of storing an initial odometer value and an initial GPS position of the vehicle 12. The next step, shown at reference numeral 302, involves the storing of a subsequent odometer value and a subsequent GPS position of the vehicle 12. Such storing of odometer values and GPS positions of the vehicle 12 can take place at regular predetermined intervals or at randomly chosen intervals. Such data recordings may take place in response to triggers (such as those described herein in reference to FIG. 2). In this example of the method, it is particularly desirable that data be recorded at regular intervals (e.g., as set by the manufacturer, or as reset by, for example, a fleet manager or rental car company manager). In a non-limiting example, the odometer values and GPS position of the vehicle 12 can continuously be monitored at preset intervals. In another non-limiting example, the odometer values can be monitored at irregular intervals. An irregular interval is irregular because the monitoring is not continuous, but rather is triggered by a predictable event, such as the arrival of a new user of the vehicle 12 (e.g., in the case of a rental car drive) or the beginning of a new trip for a continuing user. Once the irregular interval is triggered, then regular data measurements may take place throughout the use/trip. Alternatively, the data recording intervals may be based on a purely random check of the odometer values and GPS position values, as determined by a computer algorithm generating signals to trigger data recording at such random intervals.

The method then includes comparing a distance between the initial and subsequent vehicle positions to determine a difference between the initial and subsequent odometer values, as shown at reference numeral 304. Such a comparison may take place at the telematics unit 14 or at the call center 24 (e.g., via a software routine or a human advisor 62). Computing this difference may be accomplished using the mileage, the great circle distance calculation, or by plugging the vehicle positions into a digital map database to generate one or more routes between the two positions.

It is to be understood that for the comparison, the subsequent odometer value and vehicle position do not necessarily have to be the value and position recorded at the time interval directly following the initial odometer and initial position recording event. Rather, if it is desirable to compare the initial data recordings with data recorded at a much later time, the data recorded at that desirable subsequent time interval may be used for comparison. In an example, the initial data may be the odometer and position readings at the time a trip began, and the subsequent data used for comparison may be the odometer and position readings 3 hours after the trip began.

As reference numeral 306 of FIG. 3 illustrates, from the comparison, it can be determined whether there is a discrepancy between the vehicle position distance and the odometer reading difference. If there is no discrepancy between these calculated values, then the conclusion is that no odometer tampering has occurred (see reference numeral 308).

Once this determination is made, the telematics unit 14 or call center 24 may notify any party monitoring odometer tampering, if appropriate.

However, if there is a discrepancy between the calculated position distance and odometer difference, then the method continues at reference numeral 310. When a discrepancy is detected, i) at least one possible route between the first and second GPS positions of the vehicle 12 and ii) a distance corresponding with the at least one possible route are generated. Such routes are generated using an on-board or an off-board (e.g., located at the call center 24) navigation system having map generating capabilities. More specifically, such route(s) are generated using the then-current mapping software installed on or accessible by the navigation system. As non-limiting examples, generating the route or routes includes using the vehicle's initial and subsequent position and generating all possible routes between the two positions. The most likely routes generated by the system would typically include the routes or set of routes calculated with known routing criteria, such as shortest distance. Such routes might also include those routes using the most expressways or main roads, those having the shortest time, likely alternative routes (e.g., taking into account detours or severe weather conditions), or even the less likely routes (such as those routes that include less-traveled roads). The routes are generated to help determine whether a feasible route has been traversed by the vehicle 12, thus reconciling the discrepancy between the odometer reading difference and the vehicle position distance (discussed further hereinbelow).

The next step, shown at reference numeral 312, in the method of FIG. 3 involves comparing the distance between the initial and subsequent positions of the vehicle 12 with the distance corresponding to the at least one possible route. The route distance is equal to the total mileage along a respective route from the start position to the end position. It is to be understood that when multiple possible routes are generated, the distance of each route is compared with the distance between the vehicle's positions until a match is found (if a match is found). When the route distance of one of the generated route(s) is equal to the distance traveled by the vehicle 12 (as determined by the calculated distance from the initial position to the subsequent position), it is concluded that odometer tampering has not occurred (see reference numeral 314).

However, when the calculated distance between the vehicle positions is not equal to any of the route distances, the method further includes calculating a difference between each of the route distance(s) and the calculated distance between the vehicle positions, as shown at reference numeral 316. If the calculated difference is determined to be outside a predetermined threshold (see reference numeral 318), it is concluded that odometer tampering has occurred (see reference numeral 320). However, if the calculated difference is within the predetermined threshold, it is concluded that odometer tampering has not occurred (see reference numeral 314). The predetermined threshold is some distance (e.g., 1 mile, 1.5 miles, 3 miles, and no larger than 5 miles) that is small enough to conclude that odometer tampering has not likely occurred. In a non-limiting example, the predetermined threshold is +/−5% of the distance corresponding with the generated route to which the vehicle's position distance is being compared. Thus, in a given calculation to determine if odometer tampering has occurred, if a discrepancy outside the threshold (for example +/−5%) of the total measured distance is obtained, then odometer tampering can be deemed to have occurred. In another non-limiting example, the predetermined threshold is narrower, +/−3% of the distance corresponding with the generated route to which the vehicle's position distance is being compared. In still another non-limiting example, the predetermined threshold is +/−1% of the distance corresponding with the generated route to which the vehicle's position distance is being compared. After it has been determined whether or not odometer tampering has occurred, a suitable party inside or outside the system 10 may be contacted via the methods described herein in order to notify him/her of such tampering/non-tampering.

Odometer tampering often involves large mileages being not recorded or rolled back. As such, in some instances it may be desirable to increase the predetermined threshold so that minor odometer discrepancies are not mistaken for fraud.

One non-limiting example of the method shown in FIG. 3 is now provided. A rental car driver has picked up his vehicle 12 and begins his trip. The vehicle position and odometer values are collected and recorded periodically throughout the rental period. The telematics unit 14 may be programmed to compare the initial vehicle position and odometer reading with the vehicle position and odometer reading after 100 miles of travel. In this example, the distance between the vehicle positions is 105 miles, while the odometer difference is 103.5 miles. These values are transmitted to the call center 24, which uses the initial and subsequent vehicle positions to generate one or more feasible routes therebetween. In this example, the user is driving along a rural highway, and thus two routes are generated, one along that highway and another using secondary roads. The distance corresponding with the highway route is 104 miles and the distance corresponding with the secondary road route is 125 miles. Since the difference between the vehicle position distance and the highway route distance is within the predetermined threshold (e.g., 1 mile), it is concluded by the call center 24 that odometer tampering has not occurred.

In another non-limiting example of the method shown in FIG. 3, a rental car driver has picked up his vehicle 12 and begins his trip. The vehicle position and odometer values are collected and recorded periodically throughout the rental period. The telematics unit 14 may be programmed to compare the initial vehicle position and odometer reading with the vehicle position and odometer reading after 50 miles of travel. In this example, the distance between the vehicle positions is 100 miles, while the odometer difference is 75 miles. These values are transmitted to the call center 24, which uses the initial and subsequent vehicle positions to generate one or more feasible routes therebetween. In this example, the user is driving along a rural highway, and thus two routes are generated, one along that highway and another using secondary roads. The distance corresponding with the highway route is 105 miles and the distance corresponding with the secondary road route is 110 miles. Since the difference between the vehicle position distance (e.g., 100 miles) and the highway route distance (105 miles) is outside the predetermined threshold (e.g., 1 mile) and the odometer reading difference is 25 miles off of the position distance, it is concluded by the call center 24 that odometer tampering has occurred. In this particular instance, the data and conclusion may be transmitted to the rental car company via any suitable communication means.

While several examples have been described in detail, it will be apparent to those skilled in the art that the disclosed examples may be modified. Therefore, the foregoing description is to be considered exemplary rather than limiting.

The invention claimed is:

1. A method for monitoring an odometer, the method comprising:

storing an odometer value and a vehicle position in response to an initial triggering event;

determining a second odometer value and a second vehicle position in response to a subsequent triggering event;

comparing the odometer value with the second odometer value to detect any odometer value change from the initial triggering event to the subsequent triggering event;

comparing the vehicle position with the second vehicle position to detect any vehicle position change from the initial triggering event to the subsequent triggering event; and determining, from the comparing steps, whether odometer tampering has occurred.

2. The method of claim 1 wherein when the odometer value change is zero and the vehicle position change is detected in the step comparing the vehicle position with the second vehicle position, determining includes concluding that odometer tampering has occurred.

3. The method of claim 1 wherein the initial triggering event is an ignition off cycle, and wherein the subsequent triggering event is an ignition on cycle subsequent to the ignition off cycle.

4. The method of claim 1 wherein the initial triggering event is an interval timer recording event, and wherein the subsequent triggering event is a second interval timer recording event.

5. The method of claim 1 wherein the initial triggering event is receipt of a message from a party outside a vehicle for which the odometer value and vehicle position are to be stored, wherein the subsequent triggering event is receipt of a second message from the party outside the vehicle, and wherein the messages are received at a telematics unit of the vehicle.

6. A method for monitoring an odometer, the method comprising:

storing an odometer value and a vehicle position;

storing a second odometer value and a second vehicle position;

comparing a distance between the first and second vehicle positions to a distance between the first and second odometer readings;

recognizing a discrepancy between the vehicle position distance and the odometer reading distance, thereby identifying potential odometer tampering;

generating i) at least one possible indirect route between the first and second vehicle positions, and ii) a distance corresponding with the at least one possible route;

comparing the distance between the first and second vehicle positions with the distance corresponding with the at least one possible indirect route; and determining, from the comparing, whether odometer tampering has occurred.

7. The method of claim 6 wherein the determining whether odometer tampering has occurred is accomplished by:

calculating a difference between the distance between the first and second vehicle positions and the distance corresponding with the at least one possible indirect route; and comparing the difference to a predetermined threshold to determine if the difference is outside the predetermined threshold.

8. The method of claim 7 wherein the predetermined threshold ranges is up to +/−5% of the distance corresponding with the at least one possible indirect route.

9. The method of claim 6 wherein the odometer value and the vehicle position are stored at one cycle in a regular time interval data recording period, wherein the second odometer value and the second vehicle position are stored at an other cycle in the regular time interval data recording period and wherein the method further comprises, storing subsequent odometer values and vehicle positions during subsequent cycles in the regular time interval data recording period.

10. The method of claim 9 wherein the cycles in the regular time interval data recording period occur at least one second apart.

11. A system for monitoring an odometer, the system comprising:

a call center; and a vehicle in selective communication with the call center, the vehicle including:

a telematics unit;

a global positioning system device configured to transmit a then-current time and a then-current vehicle position to the telematics unit or to the call center via the telematics unit; and an odometer configured to continuously monitor a distance traveled by the vehicle and to transmit then-current odometer values to the telematics unit or to the call center via the telematics unit;

at least one of the telematics unit or the call center configured to:

store, in response to an initial triggering event, the then-current vehicle position and the then-current odometer value;

retrieve, in response to a subsequent triggering event, a last stored then-current vehicle position and a last stored then-current odometer value;

receive, in response to the subsequent triggering event, a new then-current vehicle position and a new then-current odometer reading; and compare the new then-current vehicle position and the new then-current odometer reading with the retrieved last stored then-current vehicle position and the retrieved last stored then-current odometer value.

12. The system of claim 11 wherein the initial triggering event is an ignition off cycle, and the subsequent triggering event is an ignition on cycle subsequent to the ignition off cycle.

13. The system of claim 11, further comprising an internal timer operatively connected to the telematics unit, wherein the initial triggering event is an interval timer recording event, and wherein the subsequent triggering event is a second interval timer recording event.

14. The system of claim 11, further comprising a device outside the vehicle and in communication with the vehicle, wherein the initial triggering event is receipt of a message at the telematics unit from the device, and wherein the subsequent triggering event is receipt of a second message at the telematics unit from the device.

15. A system for monitoring an odometer, the system comprising:

a call center; and a vehicle in selective communication with the call center, the vehicle including:

a telematics unit;

a global positioning system device configured to transmit a then-current time and a then-current vehicle position to the call center via the telematics unit; and an odometer configured to continuously monitor a distance traveled by the vehicle and to transmit then-current odometer values to the call center via the telematics unit;

the call center including:

a database configured to store at least first and second odometer values and first and second vehicle positions received from the telematics unit; and an advisor program configured to:

compare a distance between the first and second vehicle positions to a distance between the first and second odometer readings; and recognize a discrepancy between the vehicle position distance and the odometer reading distance, thereby identifying potential odometer tampering;

a route generating device configured to generate i) at least one possible route between the first and second vehicle positions, and ii) a distance corresponding with the at least one possible route; and a sub-system configured to:

compare the distance between the first and second vehicle positions with the distance corresponding with the at least one possible route; and determine, from the comparing, whether odometer tampering has occurred.

* * * * *